United States Patent
Khokhlov et al.

(10) Patent No.: US 12,327,853 B2
(45) Date of Patent: Jun. 10, 2025

(54) SPACE CONFIGURABLE BATTERY STRUCTURES FOR ELECTRODE ASSEMBLIES INCORPORATING ION EXCHANGE MATERIALS

(71) Applicant: Zelos Energy Ltd., San Leandro, CA (US)

(72) Inventors: Pavel Khokhlov, San Ramon, CA (US); Alexander Gorer, Brisbane, CA (US); Sebastien Belanger, Alameda, CA (US)

(73) Assignee: Zelos Energy Ltd., San Leandro, CA (US)

( * ) Notice: Subject to any disclaimer, the term of this patent is extended or adjusted under 35 U.S.C. 154(b) by 0 days.

(21) Appl. No.: 18/493,410

(22) Filed: Oct. 24, 2023

(65) Prior Publication Data

US 2024/0055701 A1 Feb. 15, 2024

Related U.S. Application Data

(63) Continuation of application No. 17/307,746, filed on May 4, 2021, now Pat. No. 11,831,000.

(Continued)

(51) Int. Cl.
*H01M 12/08* (2006.01)
*H01M 4/02* (2006.01)
(Continued)

(52) U.S. Cl.
CPC ............ *H01M 12/08* (2013.01); *H01M 4/38* (2013.01); *H01M 4/483* (2013.01); *H01M 4/9016* (2013.01); *H01M 4/9041* (2013.01); *H01M 12/02* (2013.01); *H01M 50/46* (2021.01); *H01M 2004/027* (2013.01); *H01M 2004/8689* (2013.01)

(58) Field of Classification Search
CPC ...... H01M 12/08; H01M 12/02; H01M 50/46; H01M 4/38; H01M 4/483; H01M 4/9016; H01M 4/9041
See application file for complete search history.

(56) References Cited

U.S. PATENT DOCUMENTS

| | | | | |
|---|---|---|---|---|
| 4,888,098 A | * | 12/1989 | Nyberg ................. | G01N 27/42 204/418 |
| 2004/0201122 A1 | * | 10/2004 | O'Brien ............. | H01M 8/1004 427/372.2 |
| 2020/0018657 A1 | | 1/2020 | Sim | |

FOREIGN PATENT DOCUMENTS

| EP | 247056 B1 | 5/2016 |
|---|---|---|
| EP | 33067606 | 4/2018 |

(Continued)

*Primary Examiner* — Karie O'Neill Apicella
(74) *Attorney, Agent, or Firm* — David R. Stevens; Stevens Law Group (57) ABSTRACT

Systems and methods for space configurable battery structures for electrical assemblies incorporating ion exchange materials are described. One method to construct such a battery includes preparing a battery casing for a rechargeable battery. The preparing may further include placing one or more electrode materials into the casing. A monomer or a functionalized n-mer may be prepared for polymerization. The monomer or the functionalized n-mer may be polymerized to form an ion exchange material, which is then then cross-linked. The ion exchange material may be arranged to define an interpenetrating surface with at least a portion of at least one of the electrodes.

25 Claims, 7 Drawing Sheets

Related U.S. Application Data

(60) Provisional application No. 63/021,508, filed on May 7, 2020.

(51) Int. Cl.
*H01M 4/38* (2006.01)
*H01M 4/48* (2010.01)
*H01M 4/86* (2006.01)
*H01M 4/90* (2006.01)
*H01M 12/02* (2006.01)
*H01M 50/46* (2021.01)

(56) References Cited

FOREIGN PATENT DOCUMENTS

| | | |
|---|---|---|
| TW | 201501396 | 1/2015 |
| WO | 2011100602 | 8/2011 |

\* cited by examiner

SPACE CONFIGURABLE BATTERY STRUCTURES FOR ELECTRODE ASSEMBLIES INCORPORATING ION EXCHANGE MATERIALS

RELATED APPLICATIONS

This application is a continuation of U.S. application Ser. No. 17/307,746, filed May 4, 2021, which claims the benefit of U.S. Provisional Application Ser. No. 63/021,508, filed May 7, 2020, both of which are hereby incorporated herein by reference in their entirety for all purposes.

TECHNICAL FIELD

The present disclosure relates generally to the field of batteries and components for batteries. More specifically, the present application relates to improved space configurable battery structures.

BACKGROUND

There is a great demand for low cost battery systems with a high energy density for portable devices, internet-of-things (IoT) applications, sensors, printed circuit boards (PCB), electric vehicles, integrated electronic circuits (semiconductor chips, smart credit cards), grid storage and other applications. Unfortunately, many battery systems require complex assembly of multiple components such as electrode material, separators, collectors, and casings. Pinholes or leaks in separators or casings can result in non-operation, leakage of caustic or acidic chemical agents, and damage to products powered by a battery.

Battery systems that are useful for a variety of battery chemistries, can be inexpensively constructed, have a high reliability, and require minimal assembly steps or discrete components are needed.

SUMMARY

In one embodiment, a battery cell includes a first electrode formed from at least one of a metal foil, metal layer on a substrate and a metal mesh and a second electrode. In another embodiment, a battery cell includes a first electrode formed from at least one of a metal foil, metal layer on a substrate and a metal mesh and a second electrode formed from at least partially oxidized material in a form of at least one of a metal foil, a metal layer on a substrate and metal mesh. A layer of an ion exchange material is positioned between the first and second electrodes, with the ion exchange material having sufficient ionic conductivity to act as an electrolyte.

In some embodiments the first electrode can be about a same size and form factor as the second electrode. This can include overlapping planar positions or configurations. At least one of the first electrode and second electrodes can be positioned in a non-conductive region of an electrical device, which can include but is not limited to a printed circuit board. In some embodiments, an electrical trace on a printed circuit board can form at least a portion of an electrode.

In one embodiment, a process of manufacturing a primary or rechargeable battery cell can include forming an electrode and coating the electrode with an n-mer. A n-mer can include compositions with repeating units where n is selected to range from one to millions, including but not limited to monomers, oligomers (di-mers, tri-mers etc), and branched or unbranched polymers. The n-mer coated electrode is processed to polymerize the n-mer and form an ion exchange material that covers at least some of the electrode. In some embodiments, coating further includes dipping, spraying, or otherwise completely or partially coating the electrode with the n-mer solution. The electrode and the n-mer can be placed into a battery casing either before or after polymerization.

In some embodiments, n-mer processing can include polymerization. In other embodiments, n-mer processing can include crosslinking or curing using at least one of heat, ultraviolet, or chemical agents. In some embodiments polymerization and crosslinking can occur simultaneously, while in other embodiments polymerization is followed by crosslinking. In some embodiments a polymerized and/or crosslinked ion exchange material can be arranged to define an interpenetrating interface with at least a portion of the electrode. Providing an interpenetration interface in intimate contact can include completely or partially embedding the electrode in the ion exchange material, or alternatively, surrounding the electrode or discrete portions of the electrode with a thin film of ion exchange material. In one embodiment, electrodes can be particles fully or partially embedded, coated with, or partially contacting ion exchange material. In another embodiment, electrode particles can be mixed or otherwise intermingled with ion exchange material.

In some embodiments the electrode can include zinc (Zn), zinc oxide (ZnO), zinc hydroxide ($Zn(OH)_2$), nickel hydroxide ($Ni(OH)_2$), nickel oxyhydroxide (NiOOH), copper (Cu), brass, bronze, copper oxide (CuO) or copper hydroxide ($Cu(OH)_2$), manganese (Mn), manganese oxide (MnO), manganese dioxide ($MnO_2$), iron (Fe), steel, iron oxides ($Fe_2O_3$, $Fe_3O_4$), iron hydroxides ($Fe(OH)_2$, $Fe(OH)_3$), ferrate salts (Fe(VI)), manganate salts (Mn (VI)), permanganate salts (Mn (VII)).

In some embodiments the electrode can at least partially include electrode particles sized to be less than 300 microns and packed to have a pore volume less than 50% of total electrode volume.

In some embodiments the electrode can be solid and have a substantially planar or otherwise shaped geometry. In some embodiments the surface of the electrode is smooth. In some embodiments the surface of the electrode has roughness. In some embodiments the surface of the electrode is structured in a pattern.

In some embodiments the ion exchange material can include either an anion exchange material or a cation exchange material. The ion exchange material can include a polymeric material having attached charged functional groups.

In some embodiments, ion transport can be enabled by a liquid alkaline electrolyte contacting the electrodes or ion exchange material. Optionally, the electrolyte can have at least some incorporated ion exchange material.

In one embodiment, the battery cell can include an electrode that includes a plurality of particles and an ion exchange material contacting and surrounding at least a portion of particles of the electrode.

In one embodiment, the battery cell can include an electrode comprising a plurality of particles an ion exchange material contacting and completely surrounding a surface of at least some of the plurality of particles In one embodiment, the battery cell can include an electrode comprising a plurality of particles and an ion exchange material arranged to embed substantially all of the plurality particles of the electrode.

In one embodiment, the battery cell can include an electrode comprising a solid layer and an ion exchange material arranged to contact at least part of the solid layer surface.

In one embodiment, a method of manufacturing a rechargeable battery cell can include embedding electrodes into an ion exchange material. Embedding can involve at least one of melting, softening, depositing from a melt or solution, laminating, and pressure application. Some other techniques exist.

In some embodiments, manufacture can involve assembling the electrode and the ion exchange material into a battery prior to embedding or mixing the ion exchange material into at least some of the plurality particles. In some embodiments, manufacture can involve forming an electrode from at least one of a metal foil, a metal mesh, an at least partially oxidized metal foil and at least partially oxidized metal mesh. The electrode can be coated with an n-mer, either before or after final positioning of an electrode in a device. The n-mer coated electrode can be processed to polymerize the n-mer and form an ion exchange material that covers at least some of the electrode, with the formed ion exchange material having sufficient ionic conductivity to act as an electrolyte.

In some embodiments, the ion-exchange material film can be thicker than the material of the electrode (or foil).

In some embodiments, the ion-exchange material film can also serve as a support for otherwise "flimsy" layers of foils.

In some embodiments two foil electrodes are becoming much more rigid when ion exchange layer is been applied.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

The present disclosure relates in part to battery cells having improved cycle life and electrical performance in service. For example, the cells can exhibit higher battery discharge voltage, higher discharge capacity, lower internal resistance, and high-rate discharge capability. In some embodiments, the disclosed battery cells have a long cycle lifetime at high-rate discharge current. The present disclosure also relates in part to batteries with thin form factor, including flexible batteries, embedded batteries, batteries integrated into printed circuit boards or integrated electronic circuits.

Figure 1A:
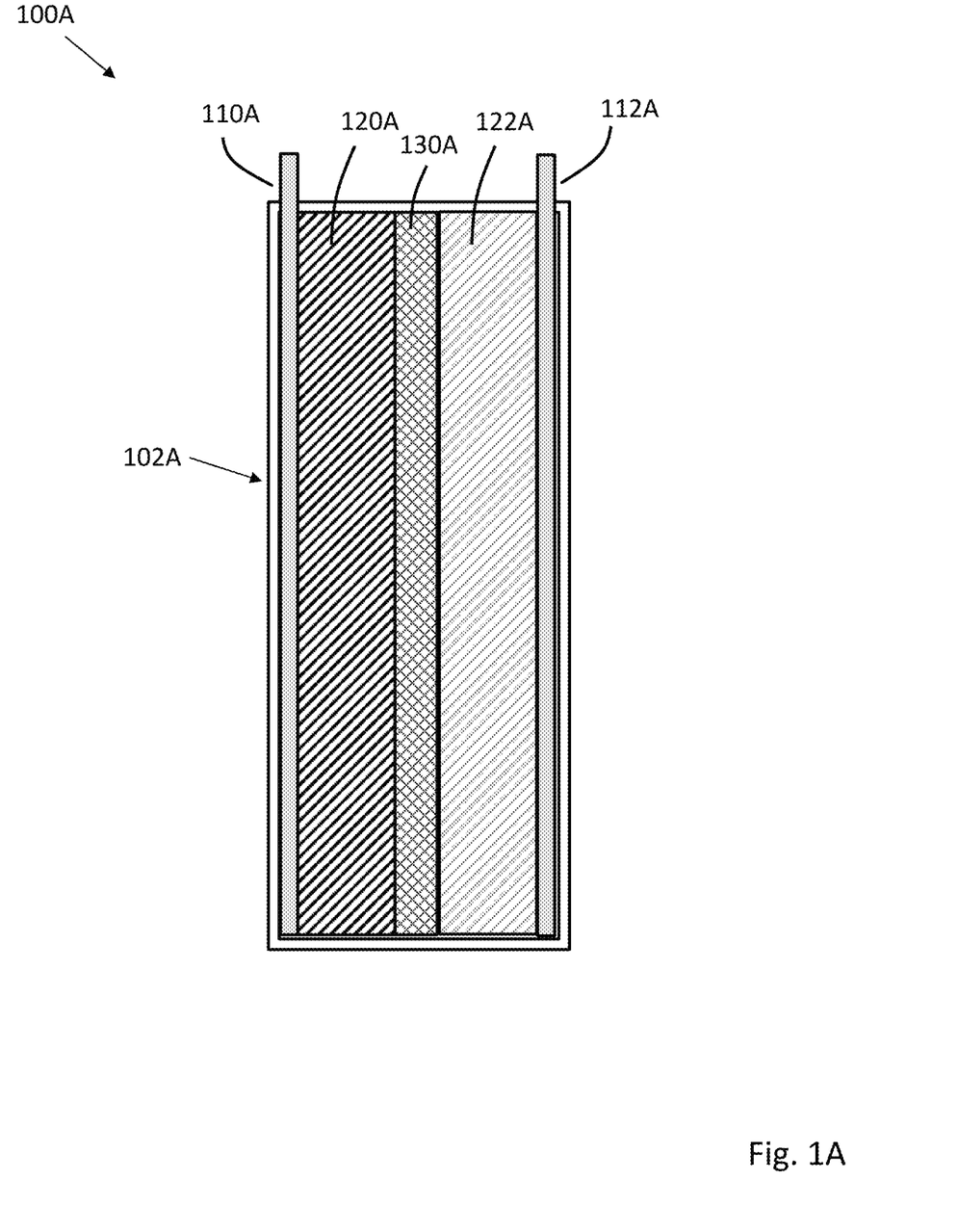
FIG. 1A illustrates a battery containing ion exchange material in contact with electrode material.

FIG. 1A that includes a casing 102A that surrounds various battery components. Battery components can include current collectors 110A and 112A that facilitate charge and discharge of the battery cell system 100A. Other components include electrode material 120A and 122A that respectively contact current collectors 110A and 112A. The electrode material 120A and 122A are separated from each other by a separator 130A that only permits ion flow between the material. In one embodiment, electrode material can be coated with an ion exchange material that also acts as a separator 130A. In some embodiments, the ion exchange material can have sufficient ionic conductivity to act as an electrolyte.

Figure 1B:
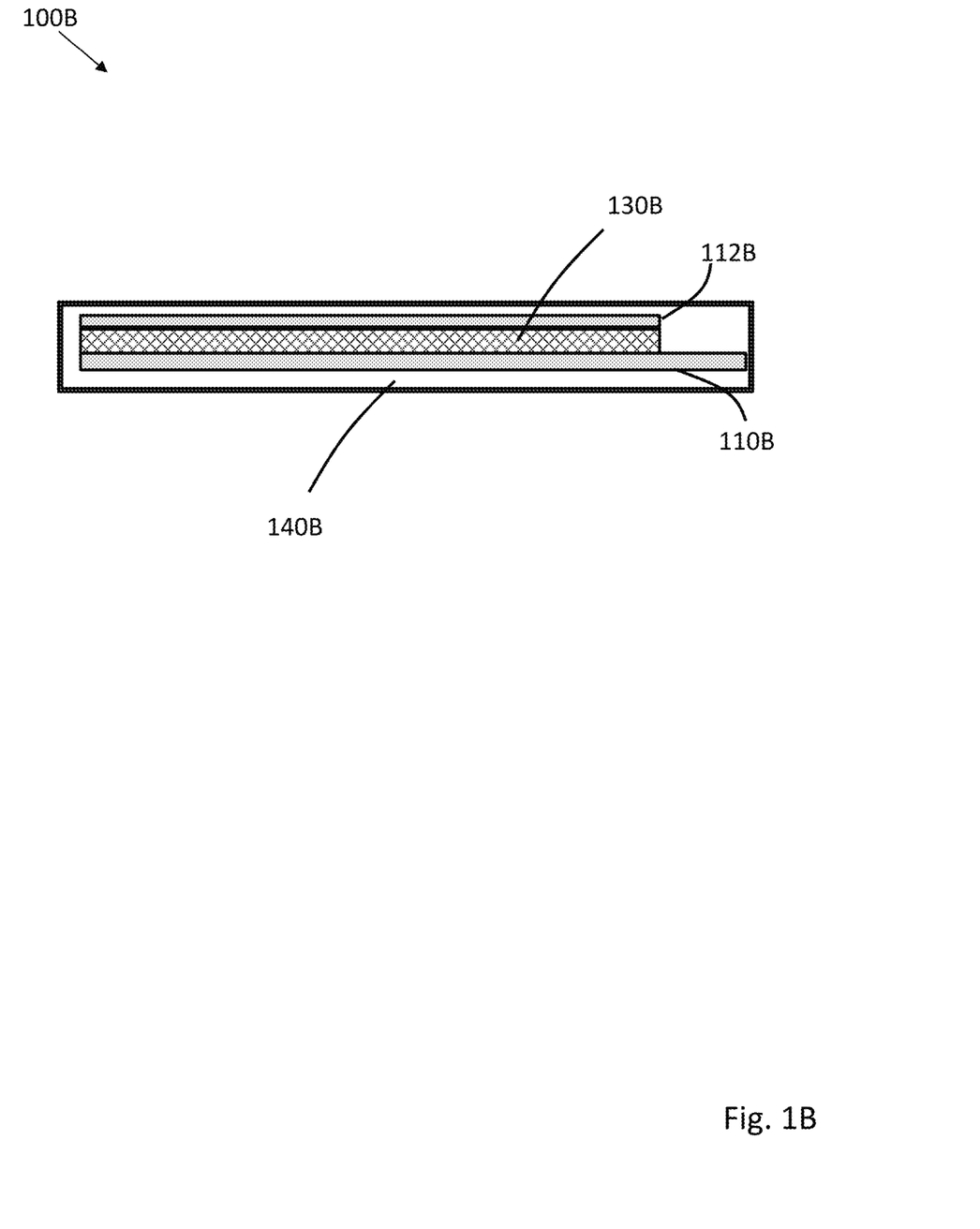
FIG. 1B illustrates a battery containing ion exchange material in contact with planar mesh or film electrode material.

Many electrode types and spatial layouts for batteries are possible with the described battery systems and chemistries. For example, as seen in FIG. 1B, a first electrode 110B can be formed from at least one of a metal foil and a metal mesh. A second electrode 112B can formed of at least one of a metal foil, a metal layer on a substrate and metal mesh. In some embodiments, electrode material forming electrode 112B can be a powder or other fine grained mixture. In one embodiment, electrode foils can at least partially participate in electrochemical processes in a battery and also have enough electronic conductivity to serve as current collectors. A layer of an ion exchange material 130B can be positioned between the first and second electrodes 110B and 112B, with the ion exchange material 130B having sufficient ionic conductivity to act as an electrolyte.

In this embodiment the first electrode 110B can be about a same size and form factor as the second electrode 112B. The electrodes 110B and 112B can be placed in overlapping planar positions or configurations. At least one of the first electrode 110B and second electrodes 112B can be positioned in a non-conductive region of an electrical device 140B, which can include but is not limited to being a printed circuit board. In some embodiments, an electrical trace on a printed circuit board can form at least a portion of an electrode, with the trace at least partially extending away from contact with the ion exchange material to allow electrical connection to power electrical devices or for battery recharge.

In some embodiments, manufacture of a rechargeable battery such as illustrated in FIG. 1B can involve forming an electrode from at least one of a metal foil, a metal mesh, and a partially oxidized metal mesh or metal foil. The electrode can be coated with an n-mer, either before or after final positioning of an electrode in a device. The n-mer coated electrode can be processed to polymerize the n-mer and form an ion exchange material that covers at least some of the electrode, with the formed ion exchange material having sufficient ionic conductivity to act as an electrolyte.

In some embodiments, the ion exchange material that separates or coats the electrodes can be an electrolyte. This can reduce possibility of shorting and in some embodiments help provide cell rigidity. In some embodiments, this cell rigidity reduces a need for self-supported external containers or packaging such as are often required to hold conventional battery powders or granulated material.

The battery cell system can include anode, cathode, ion exchange, and other materials and components as described in the following:

Electrodes

Electrode material can include material formed as thin films, meshes, foils or metal layers deposited on various substrates. In some embodiments the electrode material can be oxidized thermally, electrochemically or using chemical oxidizers to form an oxide or a hydroxide layer on the surface of the electrode. Structure of the oxidized layer may include plurality of particles or be a substantially solid layer or a porous layer. In some embodiments the pore structure in the oxidized layer can be ordered or preferentially aligned in one or more directions.

In some embodiments electrode material can include structured patterns such as columns, needles, groove, or slots. In some embodiments electrodes can be loosely arranged materials, rigidly bound or sintered structures, or solid materials with continuous pore structures. In one embodiment, electrodes can be formed from particles provided in various forms such as powders, granules, pellets, or nanomaterial. In certain embodiments, particles can have an average size (diameter or longest dimension) of between about 0.1 μm to 300 μm, and in a specific embodiment, between about 100 μm and 1 μm. In some embodiments, relatively homogeneous particle sizes can be used, while in other embodiments heterogenous sized materials can be used. Electrode materials can be processed to increase effective surface area. In some embodiments, particles can be processed by heating, melting, fusing, or sintering to bind together the particles. In other embodiments, additional binders can be used to hold particles together.

Current Collectors

At least a portion of electrode material is placed in contact with a current collector. The current collector serves to supply an electric current so that it can be consumed for the electrode reaction during charge and collect an electric current generated during discharge. The current collector is typically formed from a material which has a high electrical conductivity and is inactive to electrochemical battery cell reaction. The current collector may be shaped in a plate form, foil form, mesh form, porous sponge-like form, punched or slotted metal form, or expanded metal form.

The material of the current collector may include Ni, Ti, Cu, Al, Pt, V, Au, Zn, Fe and alloys of two or more of these metals such as stainless steel, bronze, or brass. Other embodiments may include graphite cloth, graphite foil, copper sheet or mesh slotted or woven brass.

In some embodiments, electrode does not require a separate current collector because it is inherently a good electronic conductor. For example, Zn foil. In some embodiments electrode is formed by oxidizing surface of a metal current collector and a current collector as a separate component is also not needed.

Anode Material

Anode materials for an electrode can include a wide range of materials such as zinc, aluminum, magnesium, iron, and lithium and other metals in pure, oxide form or salt form, or combinations thereof. In some embodiments, relatively pure Zn, ZnO or a mixture of Zn and ZnO can be used. In some embodiments, anode material comprises iron (Fe), steel, iron oxides ($Fe_2O_3$, $Fe_3O_4$), iron hydroxides ($Fe(OH)_2$, $Fe(OH)_3$). For a zinc negative electrode, the electrochemically active material is the zinc oxide powder or a mixture of zinc and zinc oxide powder, zinc foil or partially oxidized zinc foil.

More broadly, anode materials can include:

Any metal M, metal oxide $MO_x$ or metal salt having a redox potential E0 lower than the redox potential of the cathode material.

Any metal oxide $MO_x$ having a redox potential E0 lower than the redox potential of the cathode material.

Any alloy of any metals MM1M2 . . . Mn, mixed oxides or mixed salts having a E0 lower than the E0 of the cathode material.

Any polymer that can accommodate ions in its structure having a redox potential E0 lower than the redox potential of the cathode material.

Any mixture of one or more of the above mentioned type of materials.

Cathode Material

Cathode material for an electrode can include a wide range of materials such as metal or metal containing compounds such as ferrate salts (Fe(VI)), manganate salts (Mn(VI)), permanganate salts (Mn (VII)), nickel hydroxide $Ni(OH)_2$, nickel oxyhydroxide NiOOH, manganese dioxide $MnO_2$, manganese oxide MnO, iron (Fe), steel, iron oxides ($Fe_2O_3$, $Fe_3O_4$), iron hydroxides ($Fe(OH)_2$, $Fe(OH)_3$), copper (Cu), brass, bronze, copper oxide (CuO) or copper hydroxide ($Cu(OH)_2$), silver (Ag), silver oxides ($Ag_2O$, AgO) or any combinations.

In some embodiments, the cathode may be an air electrode.

More broadly, cathode materials may include:

Any metal M, metal oxide $MO_x$ or metal salt having a redox potential E0 larger than the redox potential of the anode material.

Any metal oxide $MO_x$ having a redox potential E0 larger than the redox potential of the anode material.

Any alloy of any metals MM1M2 . . . Mn having a E0 larger than the E0 of the anode material.

Any metal fluoride MF, having a redox potential larger than the anode material.

Any alloy MM1M2 . . . $MnO_xFm$ with n larger or equal to 2 and m being larger or equal to zero.

Any polymer that can accommodate ions in its structure having a redox potential E0 larger than the redox potential of the anode material.

Any mixture of one or more of the above mentioned type of materials.

Additives and Binding Agents

Various additives can be used to improve electrochemical, electrical, or mechanical features of the electrodes. For example, electrochemical performance can be improved by addition of nickel, nickel hydroxide, nickel oxyhydroxide, or nickel oxide containing cathode material that can incorporate or be coated with small amounts of cobalt oxide, strontium hydroxide ($Sr(OH)_2$), barium oxide (BaO), calcium hydroxide ($Ca(OH)_2$), $Fe_3O_4$, calcium fluoride ($CaF_2$), or yttrium oxide (Y2O3) to improve battery cell performance. As another example, electrode can include an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 20% by weight of a dry negative electrode formulation. Indium oxide may be present in a concentration of between about 0.05 and 10% by weight of a dry negative electrode formulation. Aluminum oxide may be provided in a concentration of between about 1 and 10% by weight of a dry negative electrode formulation.

Additionally, some additives may participate in the chemical process during the battery cycling to create new phases of electrodes and improve cycling performance and stability of the battery. Such additives can include but are not limited to Bi2O3 containing compositions.

In certain embodiments, one or more additives may be included to improve corrosion resistance of the zinc electrode material. Specific examples of anions that may be included to reduce the solubility of zinc in the electrolyte include phosphate, fluoride, borate, zincate, silicate, or stearate. Generally, these anions may be present in an electrode in concentrations of up to about 10% by weight of a dry electrode formulation.

Additives that improve electrical characteristics such as conductivity can also be added. For example, a range of carbonaceous materials can be used as electrode additives, including powdery or fibrous carbons such as graphite, coke, ketjen black, and acetylene black. Carbonaceous nanomaterials can also be used such as single or multiwalled carbon nanotubes, carbon nanofibers, multi-layered carbon nanoparticles, carbon nanowhiskers, or carbon nanorods.

Additives may be provided as chemically homogeneous components into a mixture or solution, co-precipitated, or coated onto particles Mechanical properties can be improved in one embodiment by addition of binding agents to provide increased electrode mechanical strength, and flexure or crack reduction for the electrode. Binding agents may include, for example, polymeric materials such as polytetrafluoroethylene (PTFE), polyethylene (PE), polypropylene (PP), polyisobutylene (PIB), polyvinyl alcohol (PVA), polyacrylic acid, polyvinyl acetate, carboxy methyl cellulose (CMC), styrene butadiene rubber (SBR), polyethylene oxide (PEO), polybutylene terephthalate (PBT) or polyamides, polyvinylidene fluoride (PVDF), silicone-based elastomers such as polydimethyl siloxane (PDMS) or rubber materials such as natural rubber (NR), ethylene propylene rubber (EPM) or ethylene propylene diene monomer rubber (EPDM).

Ion Exchange Material

The ion exchange material is generally selective for the transport of either cations or anions. An anion selective ion exchange material can be used alone, a cation selective ion exchange material can be used alone, or they can be used in combination with each other. In one embodiment the ion exchange material can be an organic or polymeric material having attached strongly acidic groups, such as sulfonic acid including, sodium polystyrene sulfonate, or polyAMPS. Alternatively, the ion exchange material can be an organic or polymeric material having attached strongly basic groups, such as quaternary amino groups including trimethylammonium groups (e.g. polyAPTAC). In another embodiment, the ion exchange material can be an organic or polymeric material having attached weakly acidic groups, including carboxylic acid groups. Alternatively, the ion exchange material can be an organic or polymeric material having attached weakly basic groups, typically featuring primary, secondary, and/or tertiary amino groups (e.g. polyethylene amine).

The ion exchange material can be provided to interact with electrode material as a fully or partially embedding polymer, a particle mixture, a membrane or film, particulates or beads, or a coating. The anode alone, the cathode alone, or both the anode or cathode can be configured to interact with an ion exchange material, which can be the same or different material for the respective electrodes.

Ion Exchange Material Processing

In some embodiments, an ion exchange material can be manufactured using n-mer based coating, polymerization, or crosslinking processes. A n-mer can include compositions with repeating units where n is selected to range from one to millions, including but not limited to monomers, oligomers (di-mers, tri-mers etc), and branched or unbranched polymers. Typically, an n-mer can held in solution using a suitable solvent, or alternatively or in addition can be meltable. A n-mer can be coated over electrode material, including solid surfaces, variously sized particles (including nanoscale to millimeter scale particles), strips, plates, needles, porous structures, or more complex structures. Polymerization through heat, UV, crosslinking agents, or combinations thereof can create a polymerized ion exchange material. In some embodiments the polymerized ion exchange material is further cross-linked. In some embodiments the polymerization and cross-linking steps happen simultaneously. In some embodiments a step of ion exchange is used to transform the ion exchange material into suitable form (for example, OH-form). The ion exchange step can include soaking of the battery components in solution containing required ions (for example, KOH solution). The ion exchange step can happen as a separate step or during soaking of the battery components in electrolyte. In some embodiments, electrode particles or structures can be coated with a n-mer and crosslinked before assembly into a battery or placement in a casing, while in other embodiments, the n-mer can be added and crosslinked after the electrode particles or structures are emplaced in a battery, positioned on a collector, or held within a casing, containment shell or containment area. In one embodiment, n-mer material can be applied by dipping the electrode material or plurality of particles formed into an electrode into a bath of the n-mer solution. In other embodiments, n-mer material can be sprayed, dripped, printed, melted, or otherwise directed to contact electrode material.

In some embodiments, a suitable n-mer(s) for forming the ion exchange material can have a range of function groups, including ionogenic functional groups, functional group for polymerization, and/or functional groups for cross-linking. Ionogenic functional groups can include one or more of primary, secondary, tertiary or quaternary amino groups in basic or salt forms; carboxy groups in acidic or salt forms; or sulfo groups in acidic or salt forms.

Functional groups for polymerization and functional groups for cross-linking can be independently selected from the following list:

Halogen (—Cl, —Br or —I)
Carboxy group (—COOH)
Amine (—NH2, —NH—)
Alcohol (—OH)
Thio (—SH)
N=C=O
N=C=S
C=CH2
C=CH—CH3
C≡CH
C≡C—CH3
CH=O
—NH—NH2
N=N+=N-
Epoxide In one embodiment, polymerization and/or cross-linking may be facilitated by addition of using a cross-linking agent molecule that has a different structure from the n-mer. The cross-linking agent molecule creates molecular bridges among the n-mer molecules or polymerized n-mer molecules. The cross-linking agent molecule may have at least one functional group from the table above. Molar ratio of the cross-linking agent molecule to n-mer may be in the range from 0.5% to 50%. For example, in the case of a n-mer such as (vinylbenzyl)trimethylammonium chloride (VBTMA-Cl), cross-linking can be done using divinylbenzene (DVB) with two functional groups —C=CH2. As another example, addition of formaldehyde (CH2O) with functional group —CH=O can be used to polymerize —OH (in particular, phenol) containing n-mers.

In some embodiments, a suitable n-mer(s) for forming the ion exchange material can comprise
- (3-Acrylamidopropyl)trimethylammonium compounds,
- [3-(Methacryloylamino)propyl]trimethylammonium compounds,
- [2-(Acryloyloxy)ethyl]trimethylammonium compounds,
- [2-(Methacryloyloxy)ethyl]trimethylammonium compounds,
- (Vinylbenzyl)trimethylammonium compounds, 2-Acrylamido-2-methyl-1-propanesulfonic acid compounds, 3-Sulfopropyl acrylate compounds, 3-Sulfopropyl metacrylate compounds, Diallyldimethylammonium compounds, vinylbenzenesulfonate compounds, or N-(3-Aminopropyl)methacrylamide compounds.

Electrolyte

An electrolyte is used to maintain high ionic conductivity between electrodes. Electrolytes can be aqueous based, solvent based, solid polymer, or an ionic liquid. In some embodiments, electrolytes can be semi-solid or gelatinized. Gelatinizing agents can include polymers that absorb the liquid of the electrolyte solution and swell. Such polymers can include polyethylene oxide, polyvinyl alcohol, and polyacrylamide.

In another embodiment the electrolyte can be a solid state electrolyte. In another embodiment electrolyte can be formed as a solid material with absorbed water. For example, KOH exposed to humid air.

In another embodiment electrolytes can be formed from ion exchange material such as explained above under "Ion exchange material" section.

In one embodiment aqueous alkaline electrolytes can be used. Alkaline electrolytes can include alkalis such as potassium hydroxide, sodium hydroxide, lithium hydroxide, calcium hydroxide or include inorganic salts such as zinc bromide.

Separator

A separator may be replaced with (or used in conjunction with) an ion exchange membrane or film. A conventional porous polymer separator or ion exchange separator may be provided as a polymer membrane or film. Typically, a separator is disposed between the anode and the cathode, and acts to prevent the anode and the cathode from having internal electrical shorts. In addition, the separator can also act to retain the electrolyte, particularly for battery systems that use different cathode and anode electrolyte solutions. The separator is generally required to have a porous structure or a structure having a number of perforations capable of allowing ions to pass while being chemically stable with respect to the electrolyte solution. In some embodiments, one or more separators can be formed by coating electrodes or particles that collectively form an electrode. The separator can be formed from a nonwoven fabric or a membrane having a micropore structure made of glass, polypropylene, polyethylene, resin, or polyamide. Alternatively, the separator may be constituted by a metal oxide film or a resin film combined with a metal oxide respectively having a plurality of perforations.

In some embodiments, the electrodes in the battery are covered with the ion exchange material of enough thickness to provide full coverage of the electrodes surface and avoid electrical contact between anode and cathode even if placed in direct contact with each other without separator in between. In these embodiments the battery does not have a separators as a separate component.

Processing

In one embodiment, a dry mixing process can be performed in which various anode and cathode materials, as well as additives and binders are mixed while dry. Optional processing steps such as heating, fusing, compressing, and melting ion exchange material can be performed before placing the mixture in a battery casing. In other embodiments, optional processing steps such as heating, fusing, compressing, and melting ion exchange material can be performed after placing the mixture in a battery casing. A liquid electrolyte can be added before sealing the battery casing.

According to other embodiments, a wet mixing process may instead be utilized. In a wet mixing process, one or more solvents are added at the beginning or during the mixing process, or, alternatively, one or more ingredients may be used in the form of a dispersion or suspension. The solvent(s) can be subsequently removed after the mixing process or later state in the production process.

In other embodiments, the various individual components may be made using different methods. For example, some of the electrode may be produced using a dry mixing process, while portions of the electrode may be produced using a wet process. According to yet another embodiment, it is possible to combine both dry and wet processes for the different components.

In other embodiments, electrodes may be produced using a dry mixing process, and coated with a n-mer based ion exchange material using a wet process. In other embodiments, processing steps such as crosslinking, heating, fusing, compressing, and melting ion exchange material can be performed after placing the mixture in a battery casing.

Battery and Cell Design

The battery cells can have any of a number of different shapes and sizes. For example, coin, prismatic, pouch or cylindrical cells can be used. In some embodiments, the battery cell can have a thin form factor with thickness of 2 mm or less. In some embodiments, the battery cell can be flexible. Cylindrical cells of this invention may have the diameter and length of conventional AAA cells, AA cells, A cells, C, or D or 18650 or 26650 or 21700 cells. Custom cell designs can be used in some applications. For example, prismatic cell designs can be used for portable or vehicular applications, as well as various larger format cells employed for various non-portable applications. A battery pack can be specifically designed for particular tools or applications. Battery packs can include one or more battery cells and appropriate casing, contacts, and conductive lines to permit reliable charge and discharge in an electric device.

Figure 2A:
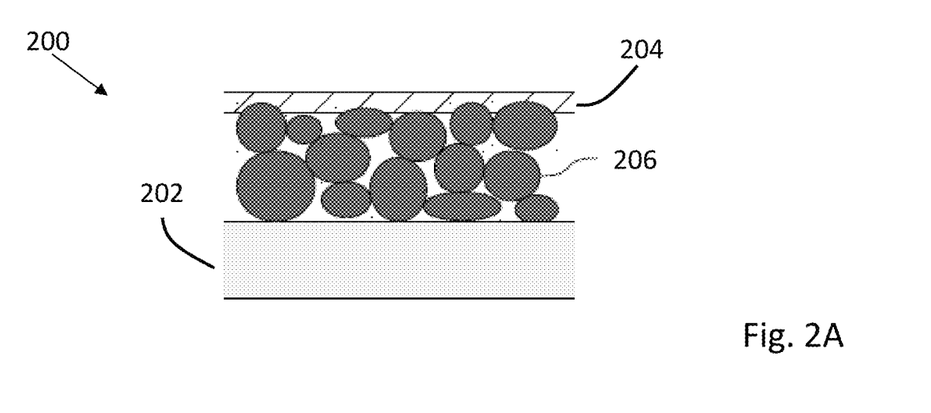
FIGS. 2A-C illustrates various forms of contact between electrode particles and ionic exchange material.
Figure 2B:
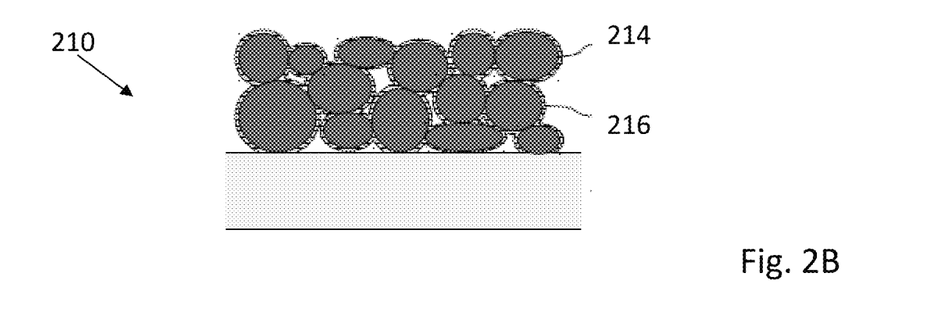
Figure 2C:
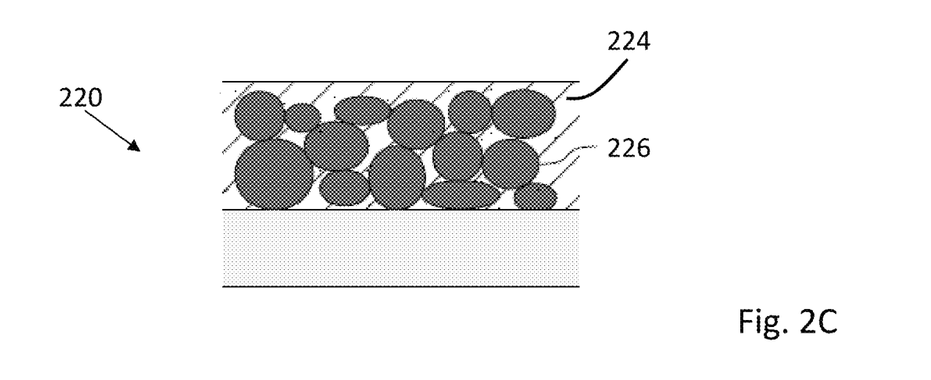

FIGS. 2A-C illustrate a portion of rechargeable battery cells 200, 210, and 220 that include an electrode and an ion exchange material arranged to define an interpenetrating interface with at least a portion of the electrode. Providing an interpenetration interface in intimate contact can include completely or partially embedding the electrode in the ion exchange material, or alternatively, surrounding the electrode or discrete portions of the electrode with a thin film of ion exchange material. In one embodiment, electrodes can be particles fully or partially embedded, coated with, or partially contacting ion exchange material. In one embodiment, coating electrodes can be accomplished using a n-mer based processing that involves coating electrodes with a n-mer that can be crosslinked to form the ion exchanged material.

FIG. 2A illustrates an electrode of a rechargeable battery cell 200 including a collector 202 contacting at least some of a plurality of electrochemically active particles 206. Another set of particles 206 also contact and are partially embedded in an ion exchange membrane 204. This ion exchange membrane can be positioned by partially melting, fusing, laminating, or pressure attachment to the particles 206. An electrolyte (not shown) can also be provided to fill in particle pore spaces and contact ion exchange membrane 204.

FIG. 2B illustrates an electrode of a rechargeable battery cell 210. Each of particles 216 contact and are surround with in an ion exchange membrane 214. This ion exchange membrane can be positioned by coating attachment to the particles 216 prior to incorporation of the particles into the rechargeable battery cell. An electrolyte (not shown) can also be provided to fill in particle pore spaces and contact ion exchange membrane 214.

FIG. 2C illustrates an electrode of a rechargeable battery cell contacting at least some of a plurality of electrochemically active particles 226. Another set of particles 226 also contact and are fully embedded in an ion exchange membrane 224. This ion exchange membrane can be positioned by melting or fusing attachment or deposition from solution to the particles 226. An electrolyte (not shown) can also be provided and contact ion exchange membrane 214.

Figure 3A:
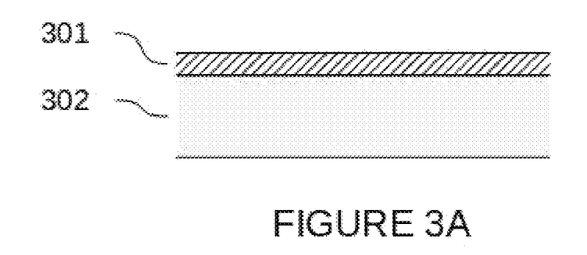
FIGS. 3A-C illustrates various forms of contact between planar electrode with a smooth surface, planar electrode with a rough surface and an electrode with a structured surface and ionic exchange material.
Figure 3B:
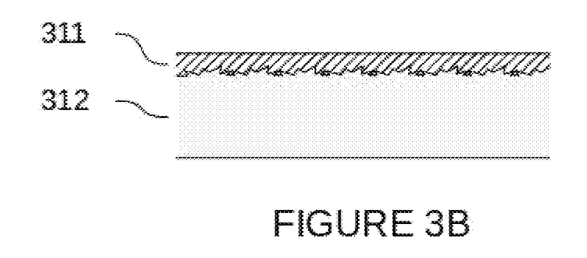
Figure 3C:
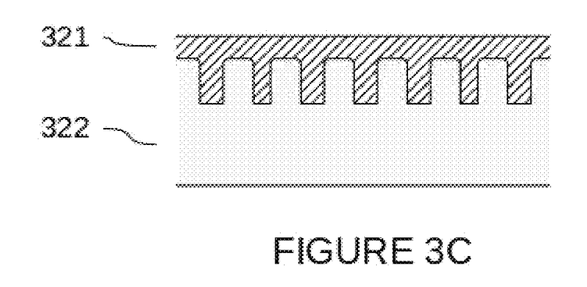

FIGS. 3A-C illustrates various forms of contact between planar electrode and an ion exchange material. As seen in FIG. 3A, an ion exchange material 301 can be positioned, coated, or otherwise attached to an electrode 302 with a smooth surface. As seen in FIG. 3B, an ion exchange material 311 can be positioned, coated, or otherwise attached to an electrode 312 with a rough surface. As seen in FIG. 3C, an ion exchange material 321 can be positioned, coated, or otherwise attached to an electrode 322 with a structured surface. As will be understood, the ion exchange material can be applied in a precursor form as an n-mer or other compound or mixture that can be processed to form useful ion exchange material.

Figure 4:
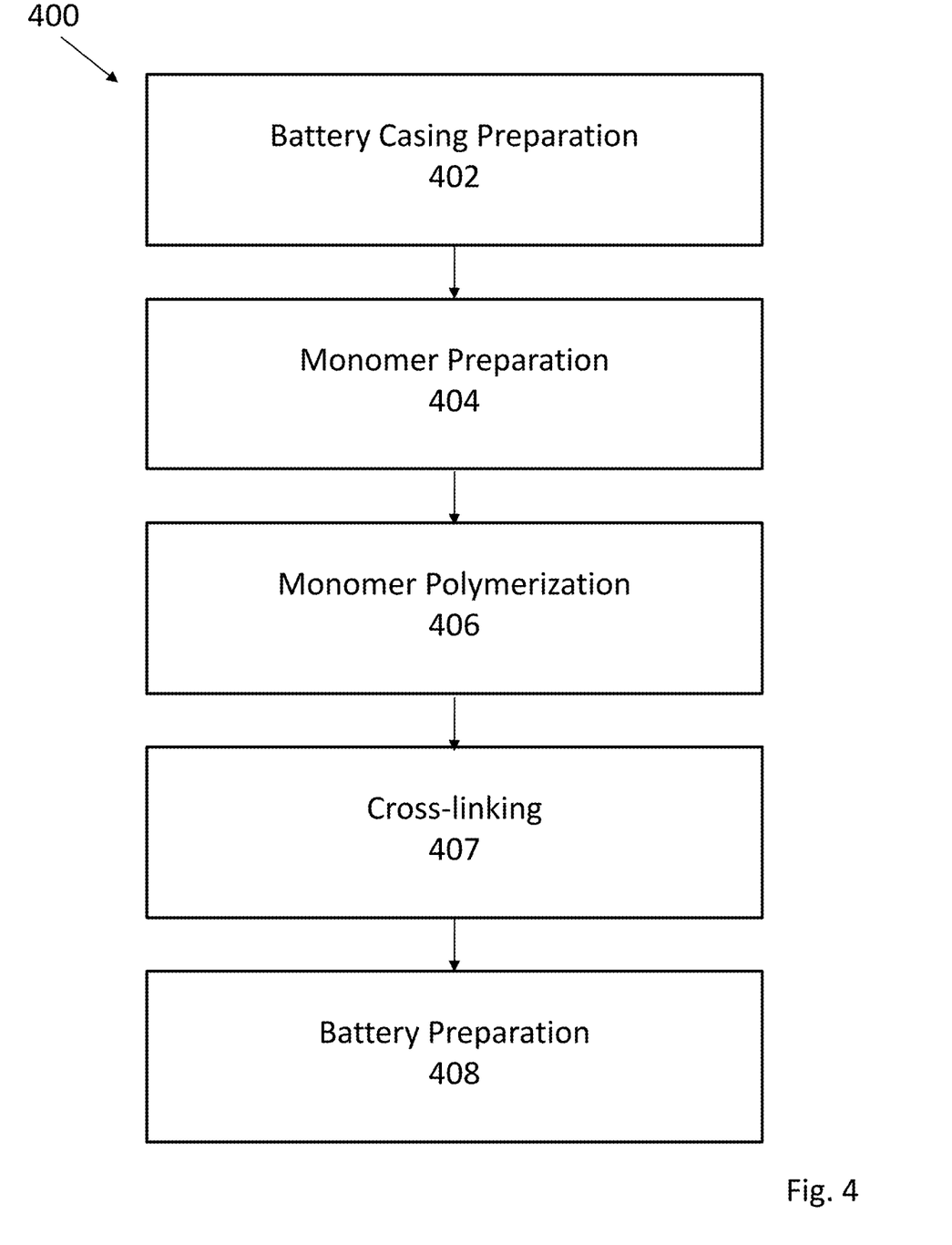
FIG. 4 shows one embodiment of a n-mer based battery manufacturing process.

FIG. 4 illustrates one embodiment of a process 400 for n-mer based processing for coating film, mesh or other electrodes with an ion exchange material. Process steps include battery casing preparation 402. In one embodiment, step 402 includes placing electrode material formed from particles provided in various forms such as powders, granules, pellets, or nanomaterial into the casing. In step 404, a functionalized n-mer is sprayed or otherwise used to coat particles. In step 406, the n-mer is polymerized using heat, UV, or crosslinking agents to form an ion exchange material that fully or partially coats the electrode. In step 407 the polymerized n-mer is further cross-linked. Steps 406 and 407 may happen simultaneously or sequentially. In some embodiments, the ion exchange material is arranged to define an interpenetrating interface with at least a portion of the electrode. Providing an interpenetration interface in intimate contact can include completely or partially embedding the electrode in the ion exchange material. In one embodiment, electrodes can be particles fully or partially embedded, coated with, or partially contacting ion exchange material. In another embodiment, electrode particles can be mixed or otherwise intermingled with ion exchange material.

In some embodiments, steps 404 through 406 can be repeated with the same electrode material to allow for a layer by layer build. In other embodiments, a different electrode material can be used with the same or different n-mer material, providing for example, a cathode with a first type of ion exchange material coating and anode with a second type of ion exchange coating, both cathode and anode being positioned within the battery casing. In a final step 408 the battery can be prepared by providing any necessary electrical interconnections and sealing the casing.

Figure 5:
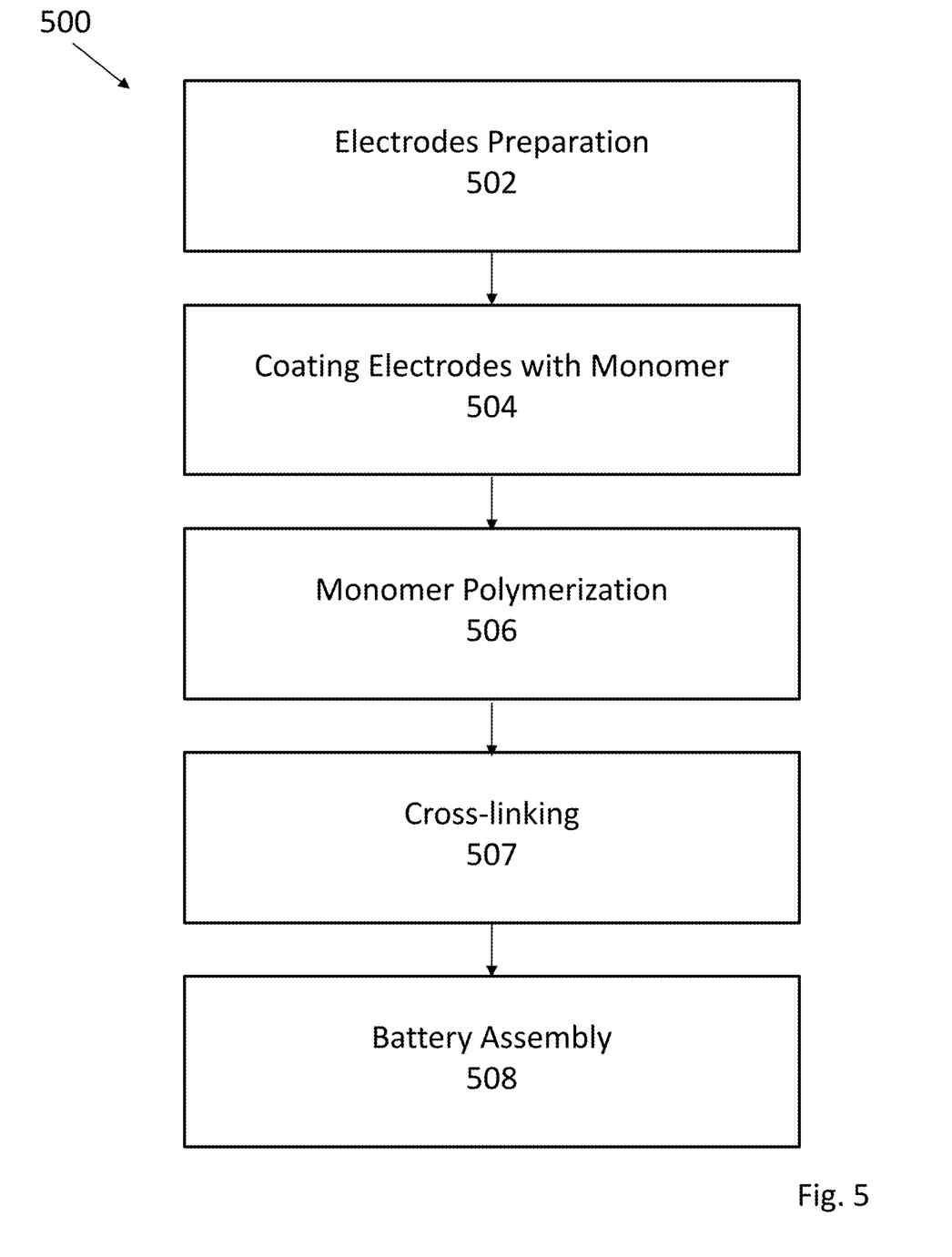
FIG. 5 shows another embodiment of a n-mer based battery manufacturing process.

FIG. 5 illustrates one embodiment of a process 500 for n-mer based processing for coating film, mesh or other electrodes with an ion exchange material. Process steps include coating of electrodes 502. For example, in step 504, a functionalized n-mer is coated over the electrodes. The step 504 can be done on the same coating line as electrodes using extrusion, slot-die coating or doctor blade coating. In some embodiments, step 504 can be done as a batch process by soaking the coated electrodes in baths of the n-mer solution or melt. In step 506, the n-mer that was coated over the electrodes is polymerized using heat, UV, or crosslinking agents to form an ion exchange material that fully or partially coats the electrode. In step 507 the polymerized n-mer is further cross-linked. Steps 506 and 507 may happen simultaneously or sequentially. In some embodiments, the ion exchange material is arranged to define an interpenetrating interface with at least a portion of the electrode. Providing an interpenetration interface in intimate contact can include completely or partially embedding the electrode in the ion exchange material. In one embodiment, electrodes can be particles fully or partially embedded, coated with, or partially contacting ion exchange material. In another embodiment, electrode particles can be mixed or otherwise intermingled with ion exchange material.

In some embodiments, steps 504 through 506 can be repeated with the same electrode material to allow for a layer by layer build. In other embodiments, a different electrode material can be used with the same or different n-mer material, providing for example, a cathode with a first type of ion exchange material coating and anode with a second type of ion exchange coating. In a final step 508 the battery can be assembled by stacking, winding or folding anode, cathode and separator, filling the battery with an electrolyte, providing any necessary electrical interconnections and sealing the casing.

Figure 6:
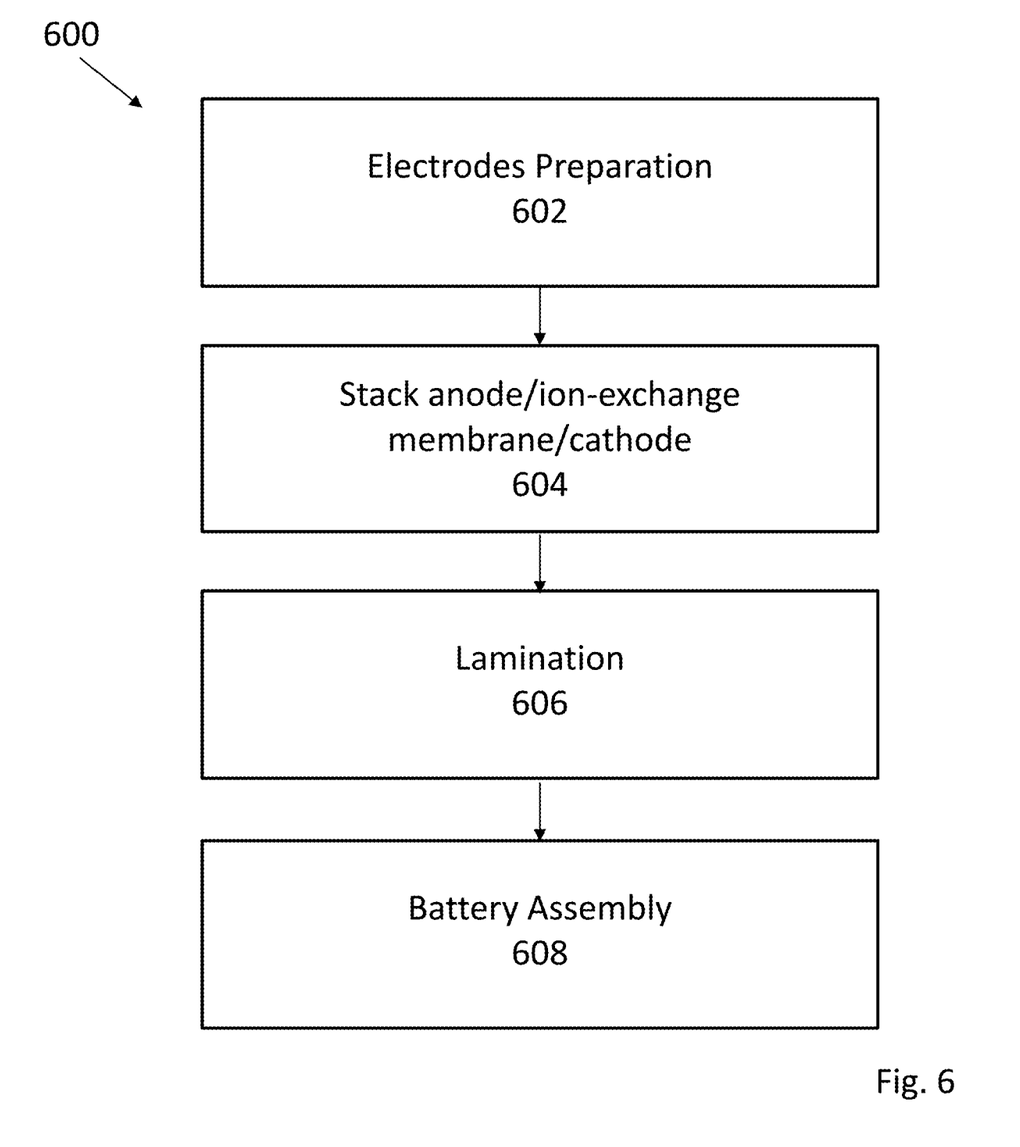
FIG. 6 shows another embodiment of a battery manufacturing process.

FIG. 6 illustrates one embodiment of a process 600 for battery fabrication with film, mesh or other electrodes with an ion exchange material. In step 602, electrodes are prepared. In some embodiments, the electrodes can be coated with n-mers, ionic exchange material, or other coating that will act as an ion exchange material after processing is complete. In step 604, a stack that includes an anode, an ion exchange membrane, and a cathode is prepared. This stack can be laminated in step 606 and used as a component for battery assembly in step 608.

Example 1

This example describes fabrication of the battery cell wherein the first electrode (cathode) comprises a brass mesh and the second electrode (anode) comprises an oxidized zinc foil.

The zinc foil (200 μm thick) was cut into a shape of an electrode with geometrical surface of 10 cm$^2$. The zinc electrode was put into electrochemical cell with stainless steel mesh as a counter electrode and 32 w. % aqueous solution of $Ca(NO_3)_2 \cdot 4H_2O$. The zinc electrode was electrochemically oxidized at constant 50 mA current for 2 hours. The oxidized zinc electrode was dried in air at room temperature overnight and laminated using FAA-3-20 anion exchange membrane (Fumatech, Germany).

Brass wire cloth (50 mesh, 80 μm wire diameter) was used as a cathode. The mesh was cut to form an electrode and laminated with FAA-3-20 anion exchange membrane.

The oxidized zinc foil anode and the brass mesh electrode was laminated together to form a laminated electrodes stack. The electrode stack was soaked in aqueous 20% KOH solution for 24 hours to convert the anion exchange membrane into OH-form. The stack was then sealed into polypropylene pouch leaving electrode terminals outside the pouch to allow for electrical connection to the battery cell.

The battery cell was then cycled with constant current charge/constant current discharge protocol between 1.9V and 0.5V. The cells delivered 1.3 mAh/cm2 discharge capacity during the test.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A method comprising:
   preparing a battery casing for a rechargeable battery, the preparing further including placing one or more electrode materials into the casing;
   preparing a monomer or a functionalized n-mer for polymerization;
   polymerizing the monomer or the functionalized n-mer to form an ion exchange material;
   cross-linking the ion exchange material; and
   arranging the ion exchange material to define an interpenetrating surface with at least a portion of at least one of the electrodes, wherein at least a first electrode of the electrodes is formed from an oxidized zinc metal foil and at least a second electrode of the electrodes is a brass wire mesh laminated with an anion exchange membrane, and the first electrode and the second electrode are laminated together to form a laminated electrodes stack.

2. The method of claim 1, wherein defining an interpenetrating surface with at least a portion of at least one of the electrodes further comprises defining the interpenetrating surface in intimate contact with the electrodes by completely or partially embedding the electrode in the ion exchange material.

3. The method of claim 1, wherein the electrodes are particles that are fully or partially embedded in the ion exchange material, coated with the ion exchange material, or are in partial contact with the ion exchange material.

4. The method of claim 1, wherein the electrodes are comprised of particles that are mixed with the ion exchange material.

5. The method of claim 1, wherein the electrodes are comprised of any combination of powders, granules, pellets, or nanomaterial.

6. The method of claim 1, wherein the preparing, the polymerization, and the cross-linking are repeated with an identical electrode material to generate a multi-layer electrode structure with the single electrode material.

7. The method of claim 1, wherein the preparing, the polymerization, and the cross-linking are repeated with different electrode materials to generate a multi-layer electrode structure with any combination of multiple stacked anodes and cathodes.

8. The method of claim 1, wherein a single n-mer material is used.

9. The method of claim 1, wherein a plurality of dissimilar n-mer materials are used.

10. The method of claim 1, further comprising assembling the battery, the assembly comprising:
    providing one or more necessary electrical interconnections associated with the battery, including electrical interconnections with the electrodes; and
    sealing the battery.

11. The method of claim 1, wherein the polymerization is performed using any combination of heat, ultraviolet (UV) radiation, or one or more crosslinking agents.

12. The method of claim 1, wherein the ion exchange material fully or partially coats each electrode.

13. A method comprising:
    coating one or more electrodes for a rechargeable battery with a monomer or a functionalized n-mer;
    polymerizing the monomer or the functionalized n-mer to form an ion exchange material;
    cross-linking the ion exchange material; and
    arranging the ion exchange material to define an interpenetrating surface with at least a portion of at least one of the electrodes, wherein at least a first electrode of the electrodes is formed from an oxidized zinc metal foil and at least a second electrode of the electrodes is a brass wire mesh laminated with an anion exchange membrane, and the first electrode and the second electrode are laminated together to form a laminated electrodes stack.

14. The method of claim 13, wherein the coating is performed by any of extrusion, slot-die coating or doctor blade coating.

15. The method of claim 13, wherein the coating is performed as a batch process by soaking the electrodes in baths of a solution of the n-mer or a melt of the n-mer.

16. The method of claim 13, wherein the ion exchange material fully or partially coats each electrode.

17. The method of claim 13, wherein the electrodes are particles that are fully or partially embedded in the ion exchange material, coated with the ion exchange material, or are in partial contact with the ion exchange material.

18. The method of claim 13, wherein the electrodes are comprised of particles that are mixed with the ion exchange material.

19. The method of claim 13, wherein the coating, the polymerizing, and the cross-linking are repeated with an identical electrode material to generate a multi-layer electrode structure with the single electrode material.

20. The method of claim 13, wherein the coating, the polymerizing, and the cross-linking are repeated with different electrode materials to generate a multi-layer electrode structure with any combination of multiple stacked anodes and cathodes.

21. The method of claim 13, further comprising assembling the battery prior to the sealing, the assembling further comprising:

stacking, winding, or folding any combination of anodes and cathodes comprising the electrodes, and one or more separators;

filling the battery with an electrolyte; and providing any necessary electrical interconnections; and sealing a casing associated with the battery.

22. The method of claim 13, wherein a single n-mer material is used.

23. The method of claim 13, wherein a plurality of dissimilar n-mer materials are used.

24. The method of claim 13, wherein the polymerization is performed using any combination of heat, ultraviolet (UV) radiation, or one or more crosslinking agents.

25. The method of claim 13, wherein defining an interpenetrating surface with at least a portion of at least one of the electrodes further comprises defining the interpenetrating surface in intimate contact with the electrodes by completely or partially embedding the electrode in the ion exchange material.

* * * * *